United States Patent [19]
Ashbee

[11] Patent Number: 5,804,277
[45] Date of Patent: Sep. 8, 1998

[54] THREE-DIMENSIONAL FIBER WEAVE WITH CUBIC SYMMETRY AND NO ZERO VALUED SHEAR MODULI

[75] Inventor: Kenneth H. G. Ashbee, Yatton, Great Britain

[73] Assignee: The United States of America as represented by the Secretary of the Air Force, Washington, D.C.

[21] Appl. No.: 673,891

[22] Filed: Jul. 1, 1996

Related U.S. Application Data

[60] Provisional application No. 60/006,236, Nov. 3, 1995.

[51] Int. Cl.[6] .......................... D06M 11/00; D06M 11/36; D06M 11/45; D06M 15/19
[52] U.S. Cl. .......................... 428/112; 139/410; 139/414; 428/113; 428/114; 442/103; 442/136; 442/137; 442/153; 442/155; 442/156; 442/158; 442/168; 442/169; 442/170; 442/173; 442/174; 442/175; 442/178; 442/179; 442/205; 442/206
[58] Field of Search ...................................... 428/112, 113, 428/114; 442/103, 136, 137, 153, 155, 156, 158, 168, 169, 170, 173, 174, 175, 178, 179, 205, 206; 139/410, 414

[56] References Cited

U.S. PATENT DOCUMENTS

| | | | |
|---|---|---|---|
| 2,357,164 | 8/1944 | Berg | 139/414 |
| 2,502,101 | 3/1950 | Morgan et al. | 139/410 |
| 3,090,406 | 5/1963 | Koppelman et al. | 442/205 |
| 3,234,972 | 2/1966 | Koppelman et al. | 139/410 |
| 5,021,283 | 6/1991 | Takenaka et al. | 428/116 |
| 5,501,891 | 3/1996 | Sailsa et al. | 139/410 |

*Primary Examiner*—James C. Cannon
*Attorney, Agent, or Firm*—Bobby D. Scearce; Thomas L. Kundert

[57] ABSTRACT

A fiber reinforced composite structure and method for fabricating the composite, are described wherein four sets of mechanically flexible fibers are interwoven in a three-dimensional woven structure wherein each fiber is woven through the structure generally along one of the four directions defined generally parallel to a body diagonal of a cube, and wherein the woven structure is impregnated with polymeric, metallic or ceramic matrix material to form a composite material which is braced against deformation by shear applied in any orientation.

15 Claims, 4 Drawing Sheets

THREE-DIMENSIONAL FIBER WEAVE WITH CUBIC SYMMETRY AND NO ZERO VALUED SHEAR MODULI

RIGHTS OF THE GOVERNMENT

The invention described herein may be manufactured and used by or for the Government of the United States for all governmental purposes without the payment of any royalty.

This application claims benefit of USC 119(e) of any U.S. Provisional application Ser. No. 60/006,236, filed Nov. 3, 1995.

BACKGROUND OF THE INVENTION

The present invention relates generally to fiber reinforced composite structures and to methods for fabricating the composites, and more particularly to improved fiber reinforced polymer, metal, ceramic or glass matrix composite structures having cubic symmetry and no zero value shear modulus with respect to any shear axis.

In the fabrication of fiber reinforced composite structures, a large number of three dimensional weaves exhibit cubic symmetry. The simplest such structure has equal numbers of fibers oriented parallel to the respective axes of a coordinate system of reference axes. In this, the simplest weave, fibers of different orientation pass in threes at a point. For rigid identical cylinders, the packing fraction for this array $\eta = 3\pi/16$. If the three-dimensional weave is viewed along any of the cube axes directions and the angle between fibers in the other two directions is changed from a right angle, that is, if a scissors-like deformation (shear) is imposed on the weave, none of the fibers in the weave are tensioned. The weave is not braced against this shear and, to a first order approximation, the shear modulus so tested is zero.

The magnitudes of many mechanical properties of solid materials are proportional to shear modulus, for example, torsional stiffness of shafts, stiffness of helical springs, abrasion resistance, creep strength, and some fracture strengths. Advantages offered by fiber reinforcement of conventional materials depends on the development of new methods of engineering design and fabrication and, in no small way, on how best to assemble fibers so as to brace host materials against shear, because the primary purposes of fiber reinforcement are to enhance stiffness and strength in polymers, to inhibit permanent deformation, particularly creep, in metals, and to introduce a measure of toughness in ceramics and glassy materials.

Instead of three fiber arrays oriented parallel to the three edge directions of a cube, three-dimensional reinforced composite materials may be fabricated that have cubic symmetry and more than three sets of fiber orientations, for example, four sets of fibers oriented parallel to the four body diagonals of a cube. However, this fiber array also has some shear moduli zero-valued.

The invention solves or substantially reduces in critical importance problems with prior art fiber reinforcement structures by providing a fiber weave structure having cubic symmetry and no zero-valued shear modulus in any direction of shear. In accordance with a governing principle of the invention, the minimum number of fiber orientations that removes all zero-valued shear moduli in a cubic symmetry is six, namely the six fiber orientation having the fibers in the structure parallel to the six face diagonals of a cube, in which array the packing fraction $\eta$ for identical rigid cylinders, is slightly greater than $\pi\sqrt{2}/8$. However, most technological fibers are flexible and may be applied to weaving technology and, as a consequence of the fibers wrapping around each other at crossovers between warp and weft fibers, the tightly wound fiber packing fraction is substantially higher than that for rigid cylinders. Accordingly, for the six fiber weave along face diagonals taught by the invention herein, the tightly wound packing fraction is $\eta = 3\pi/8\sqrt{2}$ (or 83%).

The next highest order fiber orientation weave with cubic symmetry has seven fiber orientations, three parallel to the edge directions and four parallel to the body diagonals of a cube. The higher the order of fiber orientations, the closer are the properties likely to be to isotropic, and isotropy, of elasticity and of physical properties such as thermal and electrical conductivites, for example, is desirable for many applications of composite materials. The face diagonals weave of the present invention may be a preferred choice because it can be woven, and because it can be woven with just four differently oriented sets of fibers. Precision manipulation of seven fiber sets, the smallest number of fiber sets needed to construct the cube edges plus body diagonals cubic symmetry fiber preform, and of more than seven for still higher order weaves, is a substantially more challenging task than can be readily realized using existing weaving technology.

It is therefore a principal object of the invention to provide an improved fiber reinforced composite structure.

It is another object of the invention to provide a fiber reinforced composite structure with cubic symmetry.

It is another object of the invention to provide a fiber reinforced composite structure with cubic symmetry and no zero-valued shear modulus about any axis of shear.

It is yet a further object of the invention to provide an improved composite fabrication method.

It is another object of the invention to provide a method for fabricating a fiber reinforced composite having cubic symmetry and no zero-valued shear modulus.

These and other objects of the invention will become apparent as a detailed description of representative embodiments proceeds.

SUMMARY OF THE INVENTION

In accordance with the foregoing principles and objects of the invention, a fiber reinforced composite structure and method for fabricating the composite, are described wherein four sets of mechanically flexible fibers are interwoven in a three-dimensional woven structure wherein each fiber is woven through the structure generally along one of the four directions defined generally parallel to a body diagonal of a cube, and wherein the woven structure is impregnated with polyeric, metallic or ceramic matrix material to form a composite material which is braced against deformation by shear applied in any orientation.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
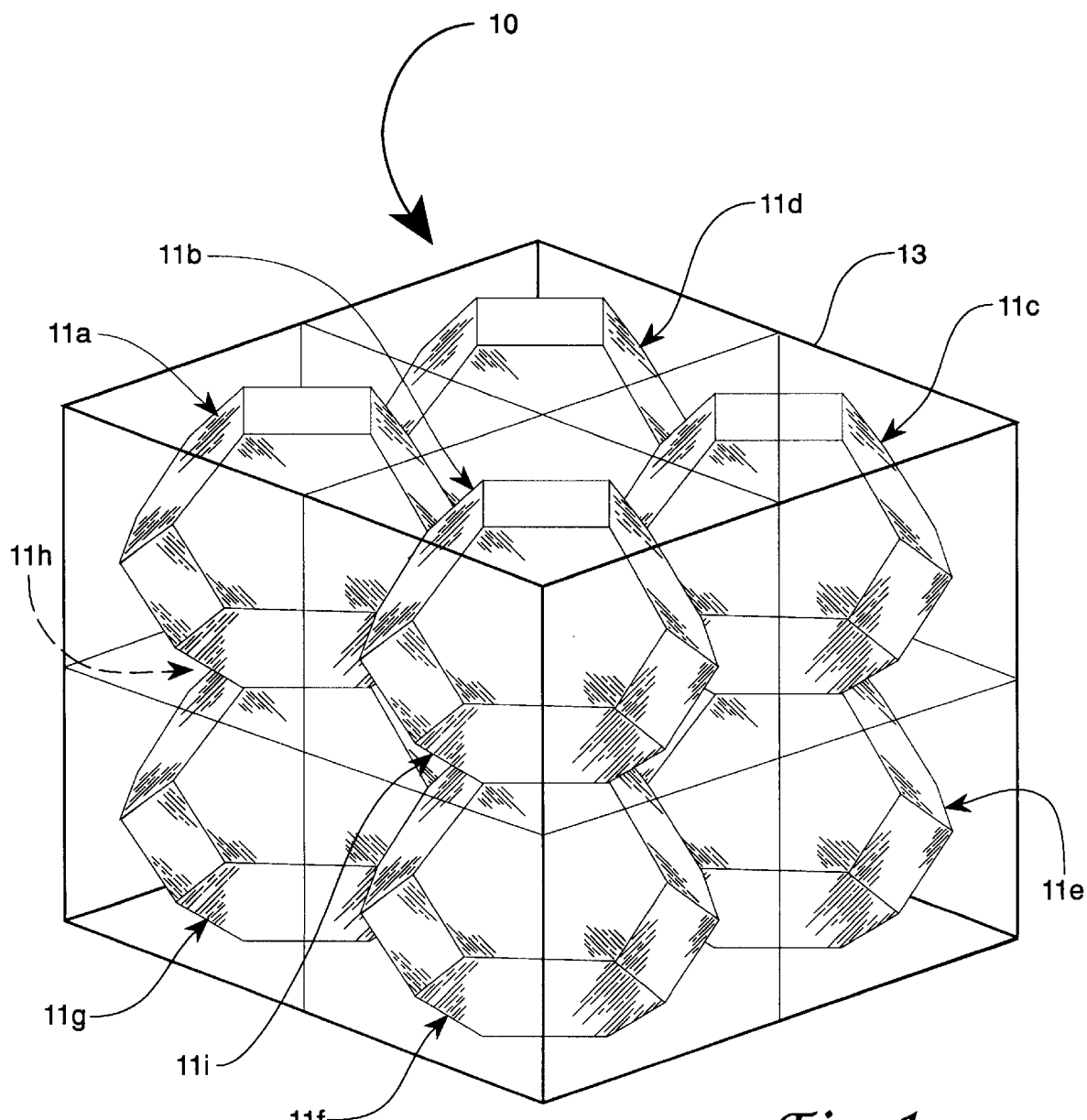
FIG. 1 illustrates the filling of space in a structure consisting of a multiplicity of identical equilateral truncated octahedra in accordance with a governing principle of the invention.

In accordance with a governing principle of the invention, it is noted that, in addition to the cubic configuration, space may be filled with a multiplicity of identical equilateral truncated octahedra. FIG. 1 illustrates the assembly 10 of nine such truncated octahedra 11a–i assembled within a cubic region 13. One truncated octahedron 11h is hidden in FIG. 1 and one truncated octahedron 11i located centrally of cubic region 13 is partially visible. In FIG. 1, individual truncated octahedra 11 are delineated by their shared edges. The eight octahedral faces of each truncated octahedron are identical regular hexagons, and the six faces defined by the truncation are identical squares. The eight hexagonal faces occur as four pairs of opposite faces, and the six square faces occur as three pairs of opposite faces. As suggested in FIG. 1, an extension of the assembly 10 of identical equilateral truncated octahedra 11a–i by the further assembly thereto of additional identical equilateral truncated octahedra inserted in the regions between the illustrated octahedra shown in FIG. 1, would precisely fill space. The square faces of the truncated octahedra are parallel to the cube faces of cubic region 13, and normals to the hexagonal faces are parallel to the body diagonals of cubic region 13. Each edge of the square faces of the truncated octahedra is parallel to one of the six face diagonals of cubic region 13.

Figure 2:
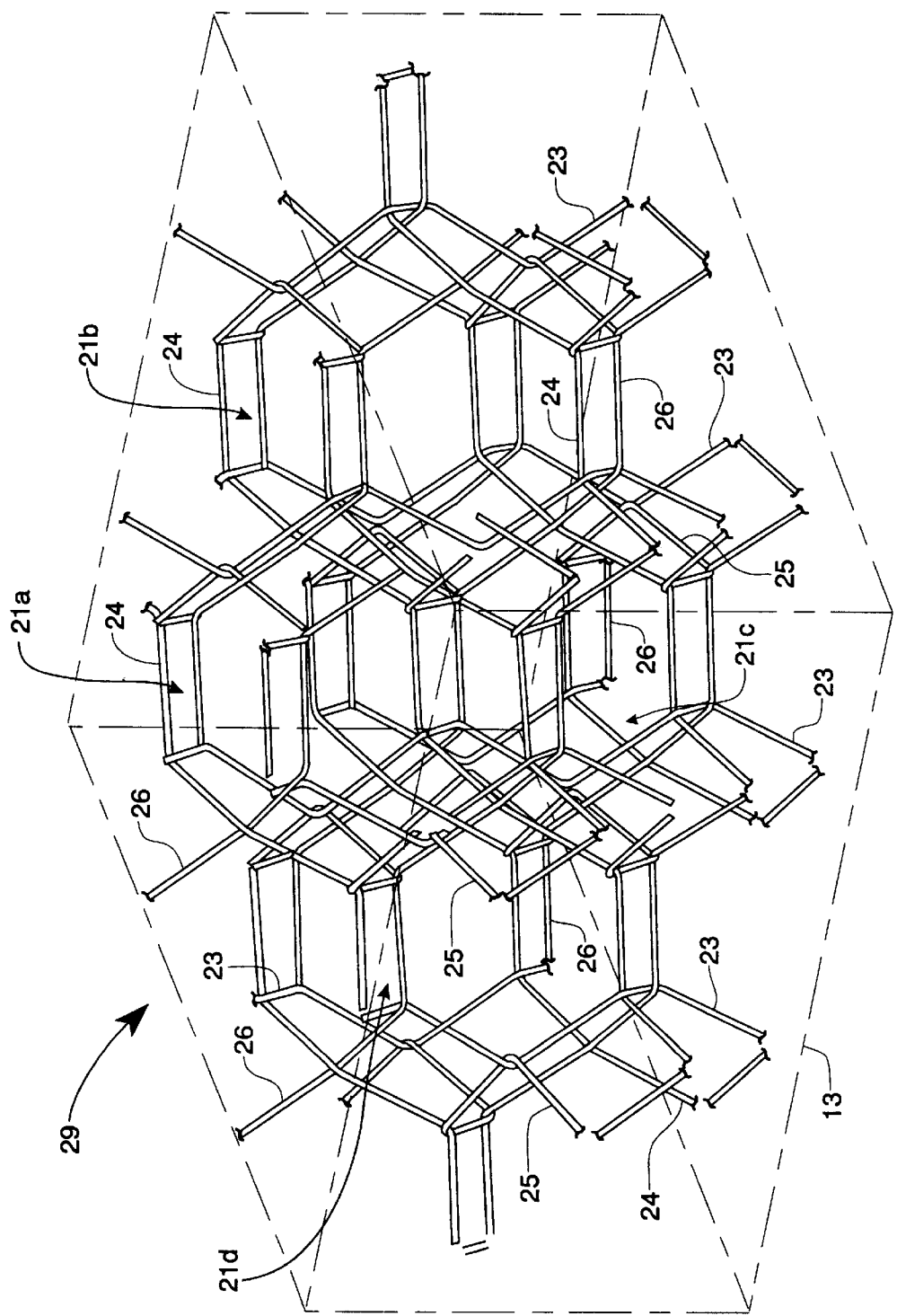
FIG. 2 shows a schematic illustration in perspective of a fiber weave fabricated according to the invention.

Referring now to FIG. 2, shown therein is a variation of a portion of the truncated octahedra structure shown in FIG. 1, wherein four truncated octahedra 21a–d are defined by a multiplicity city of fibers in sets 23,24,25,26 disposed substantially along respective edges of the square faces of truncated octahedra 21a–d. Each set 23,24,25,26 is woven through structure 29 generally along one of the respective four directions defined generally parallel to a body diagonal of cubic region 13 (FIG. 1), or, stated alternatively, along one of the respective normals to the four sets of hexagonal faces in each truncated octahedron, each fiber set looping successively over and around fibers in each of the other sets in the weave, as suggested in the weave represented in FIG. 2.

One third of the fiber segments of each of the four sets 23–26 of fibers lies parallel to each of three of the six face diagonals of cubic region 13, with successive adjacent segment pairs lying in planes parallel to the three pairs of octahedral faces of the truncated octahedra that are not perpendicular to the overall cube 13 body diagonal direction for that fiber set. Thus, along each of the four sets of fibers, there are repeated sequences of three 60° bends, or kinks, about each of the other three body diagonals of cubic region 13 as axis of bending, or kinking. One method by which the weave shown in FIG. 2 may be woven is to present four batteries of threaded needles, that pass each other in the juxtapositions shown in FIG. 3 and further described below, and to withdraw each battery in turn, by a distance equal to one fiber segment at a time, followed by the appropriate 60° tilt.

Figure 3:
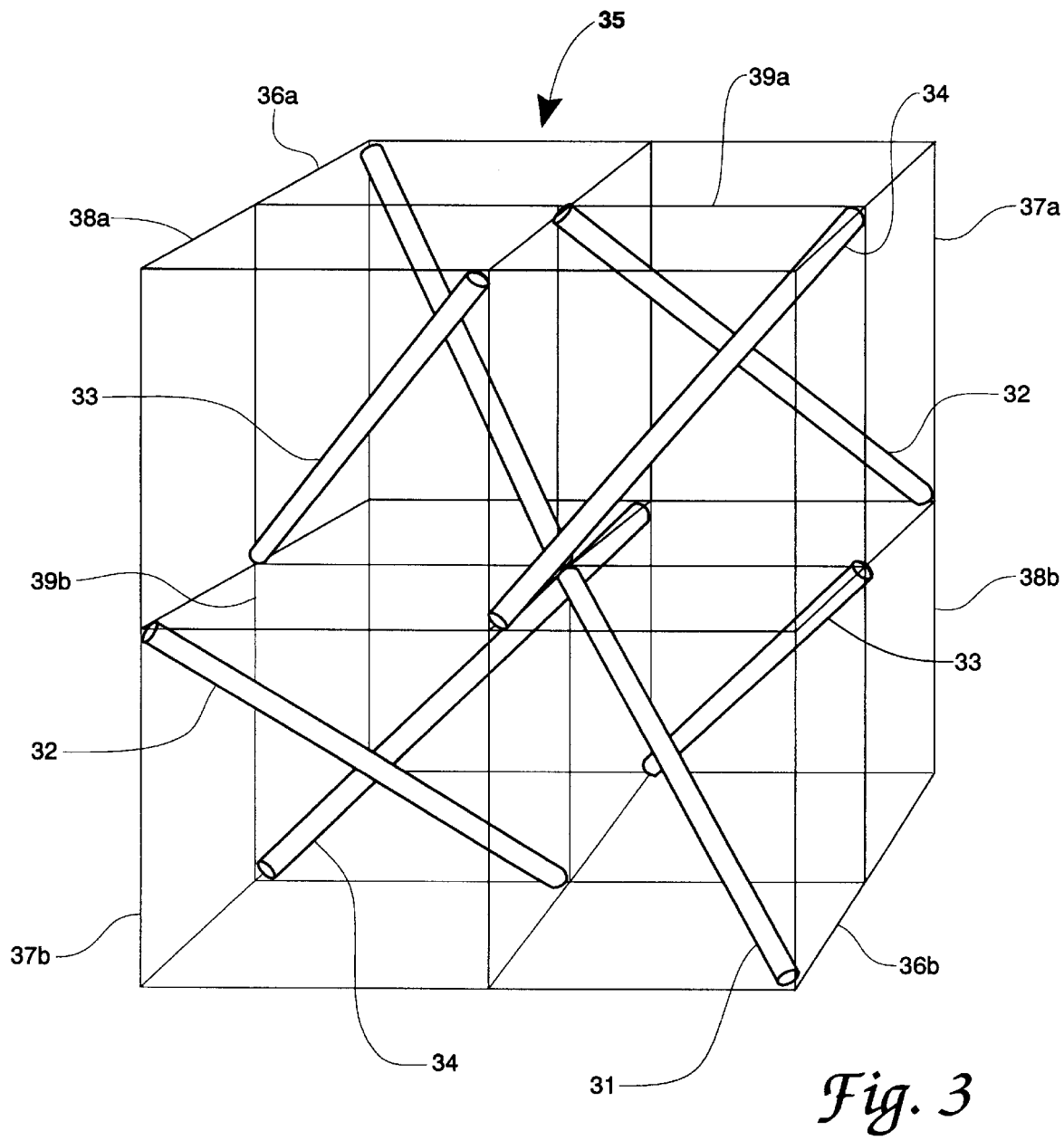
FIG. 3 shows a schematic illustration in perspective of the relative spatial positions of the overall lengths of individual fibers in the four fiber orientation sets in a fiber structure according to the invention.

FIG. 3 shows the relative spatial positions 31,32,33,34 of the overall lengths of individual fibers belonging to the four fiber sets. The overall lengths are parallel to the four body diagonals of cubic region 13 (FIG. 1) and are mutually inclined by the tetrahedral angle 70° 32'. They pass each other according to the following geometry. The large cube 35 shown in FIG. 3 is subdivided into eight equal octant cubes 36a,b,37a,b,38a,b,39a,b. Each octant cube houses one needle, and octant cubes that are opposite each other, across the body center of large cube 35 house parallel needles. The needle tilts, that have to be executed in planes parallel to octahedral faces of the truncated octahedra in order to leave behind fiber segments that are parallel to face diagonals of cubic region 13 (FIG. 1), are inclined by angles of 35° 16' to the overall needle directions shown in FIG. 3.

Figure 4:
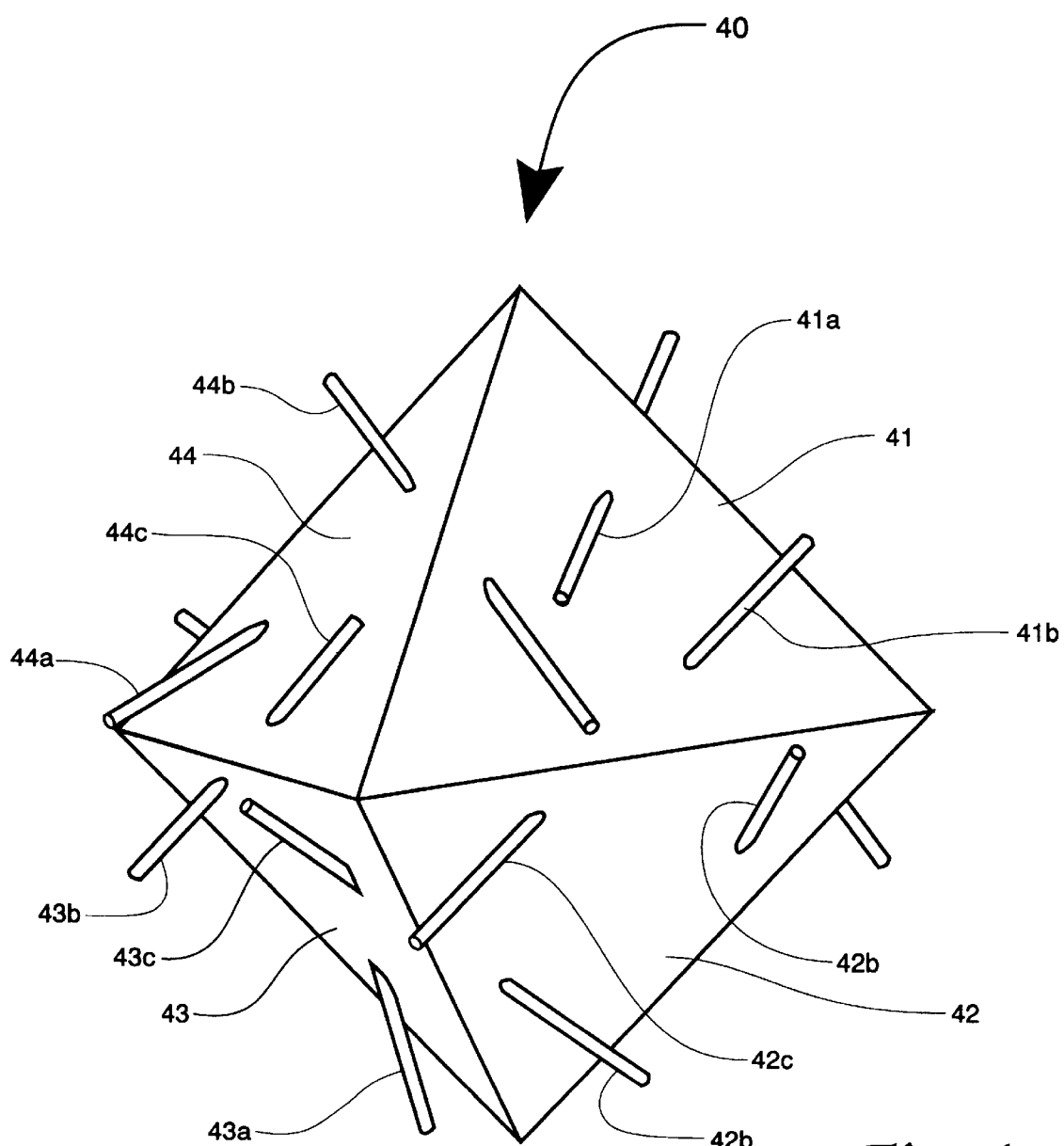
FIG. 4 illustrates positions of needle axes for making the woven structure of the invention.

The individual fibers are three-fold helices wound on equilateral prisms. The helix axes are normal to the faces of a regular octahedron. Consider the regular octahedron 40 shown in FIG. 4. On each face 41,42,43,44 of octahedron 40 (only four of eight faces of octahedron 40 are shown in FIG. 4), each point of one-third edge length are joined to all the other ponts of one-third edge length to define six small equilater triangles (not shown). Outcropping each face, at the centers of three of the six small equilateral triangles that include the points of one-third edge length, are three differently inclined helix axes 41a,b,c,42a,b,c,43a,b,c,44a,b,c. When octahedron 40 is viewed along a tetrad axis, equal numbers of all four differently oriented axes are seen to be arranged in equally spaced layers that are perpendicular to the four-fold axis of symmetry. In one method for constructing the weave, the fiber crossovers demanded by the fiber topology shown in FIG. 2 are realized by way of linear, knitting style, displacements of conventional straight needles.

Turning now to a preferred method for manufacturing the weave, the prisms, about which individual fibers are wound, lie parallel to the body diagonals of a cube as shown in FIG. 3, and are arranged symmetrically in threes around the hexagonal channels defined by the hexagonal faces of the truncated octahedra shown in FIG. 1. Moving across any face of the octahedron shown in FIG. 4, as many equally spaced needle axes as required are inserted perpendicular to the face and on the equilateral triangular grid to which the three axes shown belong. Equal numbers of needle axes are located on equal equilateral triangular grids on each of the other three orientations of faces of the octahedron. The four sets of fibers, threaded through helical hypodermic needles that withdraw from the center of the weave as they rotate about their helix axis, are made to pass one another in the manner required by the fiber topology shown in FIG. 2.

It is noted that any mechanically flexible fiber customarily used in fiber reinforced composite structures may be used in composite structures fabricated according to the invention, including, but not necessarily limited to carbon, aramid fibers such as KEVLAR, alumino-silicate, polyethylene, asbestos, cellulose, and nylon.

The weave described by this disclosure is open along channels perpendicular to the hexagonal faces of the truncated octahedra, that is, parallel to the four directions of fiber weave. Additional fibers of same or different species may be threaded into the weave along and through these channels in one or more of the four directions defined along the channels, in order to increase the fiber volume fraction of the composite product, or to form a hybrid fiber preform using fiber species with properties different from those of the main weave. The additional fibers may comprise any of the materials defined above for the woven structure of FIG. 2, or additionally may comprise fibers of substantial stiffness, such as silicon carbide, glass, boron or boron carbide to define a structure of desirable physical properties. For example, if the woven fibers are alumino-silicate fibers with high temperature toughness, and the threaded fibers are silicon carbide fibers with high high temperature stiffness, a fiber preform for a composite material that is both tough and stiff at high temperatures is obtained. Both fiber component arrays have cubic symmetry. In another application of the invention, the threaded fibers could be structured as heating elements by means of which thermal expansion and/or contraction mismatch between fiber and matrix materials can be avoided.

The fiber weave fabricated according to the invention may be used as a fiber preform and impregnated with any suitable polymer, metal, ceramic, glass, or other matrix material as would occur to the skilled artisan guided by these teachings, including, but not limited to, nylon, thermo-setting plastics including epoxies, polyesters or vinyl esters, thermoplastics such as polystyrene and polyether ethyl ketone (PEEK), aluminum-lithium alloys, titanium, titanium aluminides, ceramics such as alumina, yttria or zircon-ia, amorphous carbon, glass-ceramics, and tungsten carbide. Woven structures of substantially any desired thickness may be made for use as a preform for impregnation by a matrix material in the fabrication of a composite structure. In addition, individual layers of fiber weave fabricated according to the invention may be assembled to any desired thickness and impregnated with matrix material to form a composite of substantially any desired shape. The weave described herein braces the matrix material against shear deformations of any and all orientations in three-dimensional space. Impregnation may be by way of liquid infiltration, for example of polymer blend, or of molten metal, or of ceramic slurry, or of molten glass, and such infiltration may be with or without the assistance of a confining overpressure. Alternatively, the matrix phase may be progressively built up, for example by repeated chemical vapor depositions (CVD) which may or may not be combined with subsequent or intermittent heat treatments, either in the presence or absence of a consolidating overpressure, in order to effect chemical decomposition or chemical reaction to the final matrix phase chemical composition and microstructure.

The invention therefore provides a fiber reinforced composite structure and method for making the composite. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A fiber reinforced composite structure comprising:
   (a) a three-dimensional woven structure of a multiplicity of four sets of fibers interwoven in said structure wherein each fiber set is woven through said woven structure generally along one of the four directions defined generally parallel to a body diagonal of a cube; and
   (b) a matrix material disposed within said woven structure.

2. The composite structure of claim 1 wherein said fibers are woven generally along axes mutually inclined at about the tetrahedral angle 70° 32'.

3. The composite structure of claim 1 wherein said fibers comprise a material selected from the group consisting of carbon, aramid fibers, alumino-silicate, polyethylene, asbestos, cellulose, and nylon.

4. The composite structure of claim 1 wherein said matrix material is selected from the group consisting of nylon, epoxy, polyester or vinyl ester thermosetting plastic, polystyrene, aluminum-lithium alloys, titanium, titanium aluminides, alumina, yttria, zirconia, amorphous carbon, glass-ceramics, and tungsten carbide.

5. The composite structure of claim 1 further comprising additional sets of fibers inserted into said woven structure along one or more of said four directions.

6. The composite structure of claim 5 wherein said additional sets of fibers comprise a material different from that comprising said woven structure.

7. The composite structure of claim 5 wherein said additional sets of fibers comprise a material selected from the group consisting of silicon carbide, glass, boron, boron carbide, carbon, aramid fibers, alumino-silicate, polyethylene, asbestos, cellulose, and nylon.

8. A method for fabricating a fiber reinforced composite, comprising the steps of:
   (a) providing a source of four fibers for weaving into a woven structure;
   (b) constructing a three-dimensional woven structure of a multiplicity of four sets of said fibers interwoven in said structure wherein each fiber set is woven through said woven structure generally along one of the four directions defined generally parallel to a body diagonal of a cube; and
   (b) impregnating said woven structure with a matrix material.

9. The method of claim 8 wherein said fibers are woven generally along axes mutually inclined at about the tetrahedral angle 70° 32'.

10. The method of claim 8 wherein said fibers comprise a material selected from the group consisting of carbon, aramid fibers, alumino-silicate, polyethylene, asbestos, cellulose, and nylon.

11. The method of claim 8 wherein said matrix material is selected from the group consisting of nylon, epoxy, polyester or vinyl ester thermosetting plastic, polystyrene, aluminum-lithium alloys, titanium, titanium aluminides, alumina, yttria, zirconia, amorphous carbon, glass-ceramics, and tungsten carbide.

12. The method of claim 8 further comprising the step of inserting additional sets of fibers inserted into said woven structure along one or more of said four directions.

13. The method of claim 12 wherein said additional sets of fibers comprise a material different from that comprising said woven structure.

14. The method of claim 12 wherein said additional sets of fibers comprise a material selected from the group consisting of silicon carbide, glass, boron, boron carbide, carbon, aramid fibers, alumino-silicate, polyethylene, asbestos, cellulose, and nylon.

15. The method of claim 8 wherein said step of impregnating said woven structure with a matrix material is performed using liquid infiltration or chemical vapor deposition with or without a confining overpressure.

* * * * *